(12) United States Patent
Yasui et al.

(10) Patent No.: US 7,240,971 B2
(45) Date of Patent: Jul. 10, 2007

(54) ROLLING MOTION STABILITY CONTROL APPARATUS FOR A VEHICLE

(75) Inventors: Yoshiyuki Yasui, Nagoya (JP); Toshihisa Kato, Handa (JP); Hiroshi Matsuoka, Toyota (JP); Junya Nagaya, Kariya (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 4 days.

(21) Appl. No.: 11/190,817

(22) Filed: Jul. 28, 2005

(65) Prior Publication Data

US 2006/0267404 A1 Nov. 30, 2006

(30) Foreign Application Priority Data

Apr. 21, 2005 (JP) ............................. 2005-124104

(51) Int. Cl.
*B60T 8/46* (2006.01)
(52) U.S. Cl. ........................................ 303/146; 701/38
(58) Field of Classification Search ................ 303/155, 303/139, 140, 146; 701/36–45, 70–72
See application file for complete search history.

(56) References Cited

U.S. PATENT DOCUMENTS

| | | |
|---|---|---|
| 6,086,168 A | 7/2000 | Rump |
| 6,273,529 B1 * | 8/2001 | Woywod et al. ............. 303/173 |
| 6,292,734 B1 * | 9/2001 | Murakami et al. ............ 701/84 |
| 6,324,458 B1 * | 11/2001 | Takagi et al. .................. 701/70 |
| 2004/0267427 A1 * | 12/2004 | Suzuki et al. .................. 701/69 |
| 2005/0236896 A1 * | 10/2005 | Offerle et al. .............. 303/146 |

OTHER PUBLICATIONS

*Masato Abe, "Vehicle Dynamics and Control", May 31, 1994, pp. 2-3 and 148-149, published by Sankaido Co. Ltd. (cited in the specification).

* cited by examiner

*Primary Examiner*—Chris Schwartz
(74) *Attorney, Agent, or Firm*—Buchanan Ingersoll & Rooney PC

(57) ABSTRACT

A rolling motion stability control apparatus restrains a roll increasing tendency of a vehicle, with each wheel of the vehicle being braked by a wheel brake device. A first braking force control device is provided for applying a first braking force to the wheel, when the vehicle is turned to one direction. A second braking force control device is provided for applying a second braking force to the wheel, when the vehicle is turned to the other direction. A terminating control adjustment device is provided for adjusting the braking force control devices to continue the first braking force being applied, until the second braking force is initiated to be applied, when the vehicle is turned to the one direction, and then to the other direction.

6 Claims, 10 Drawing Sheets

FIG. 15

| ROLL STATE VARIABLE (Rst) | OUTPUT (Rot) | STATE VARIABLE INDICATIVE OF MAGNITUDE (Ram) | • ROLL ANGLE (Ra) |
|---|---|---|---|
| | | | • SUSPENTION STROKE (STxx) |
| | | STATE VARIABLE INDICATIVE OF VELOCITY (Rsp) | • ROLL VELOCITY (Rr) |
| | | | • SUSPENSION STROKE VELOCITY (dSTxx) |
| | INPUT (Rin) | STATE VARIABLE INDICATIVE OF MAGNITUDE (ROLL INPUT MAGNITUDE) (Rm) | • STEERING WHEEL ANGLE ($\delta$sw) |
| | | | (→ESTIMATED LATERAL ACCELERATION (Gy2)) |
| | | | • WHEEL SLIP ANGLE ($\alpha$xx) |
| | | | • VEHICLE SLIP ANGLE ($\beta$) |
| | | | • YAW VELOCITY (Yr) |
| | | | (→ESTIMATED LATERAL ACCELERATION (Gy1)) |
| | | | • LATERAL ACCELERATION (Gy) |
| | | | • WHEEL LATERAL FORCE (SFxx) |
| | | | • INERTIA FORCE (Fy) |
| | | | • ROLLING MOMENT (Mx) |
| | | | • YAWING MOMENT (Ym) |
| | | STATE VARIABLE INDICATIVE OF VELOCITY (ROLL INPUT VELOCITY) (dRm) | • STEERING WHEEL ANGULAR VELOCITY (d$\delta$sw) |
| | | | (→VARIATION OF ESTIMATED LATERAL ACCELERATION (dGy2)) |
| | | | • WHEEL SLIP VELOCITY (d$\alpha$xx) |
| | | | • VEHICLE SLIP VELOCITY (d$\beta$) |
| | | | • YAW ACCELERATION (dYr) |
| | | | (→VARIATION OF ESTIMATED LATERAL ACCELERATION (dGy1) |
| | | | • VARIATION OF LATERAL ACCELERATION (dGy) |
| | | | • VARIATION OF WHEEL LATERAL FORCE (dSFxx) |
| | | | • VARIATION OF INERTIA FORCE (dFy) |
| | | | • VARIATION OF ROLLING MOMENT (dMx) |
| | | | • VARIATION OF YAWING MOMENT (dYm) |

ROLLING MOTION STABILITY CONTROL APPARATUS FOR A VEHICLE

This application claims priority under 35 U.S.C. Sec. 119 to No. 2005-124104 filed in Japan on Apr. 21, 2005, the entire content of which is herein incorporated by reference.

BACKGROUND OF THE INVENTION

1. Field of the Invention

The present invention relates to a rolling motion stability control apparatus for a vehicle, particularly relates to an apparatus for restraining a roll increasing tendency of the vehicle to stabilize the rolling motion.

2. Description of the Related Arts

In order to maintain a stability of a vehicle, there is known heretofore an apparatus for controlling a braking force applied to each wheel by means of a braking system, as disclosed in the U.S. Pat. No. 6,086,168, for example. In the United States Patent, described is "For at least one vehicle-movement dynamics characteristic variable which is indicative of the tendency of the vehicle to tilt about the longitudinal axis, an associated tilting-prevention threshold value is prescribed. The respective characteristic-variable instantaneous value is acquired continuously and compared with the tilting-prevention threshold value. As soon as a characteristic-variable instantaneous value exceeds the associated tilting-prevention threshold value, the wheels which are on the outside during cornering are braked in order to prevent the vehicle tilting about the longitudinal axis of the vehicle." Also, it is described that the instantaneous values of vehicle-movement dynamics characteristic variables include variables such as the lateral acceleration, the change over time of the lateral acceleration, the attitude angle, the attitude-angle velocity, the change in the attitude-angle velocity over time and the slip angle. And, as a first embodiment of the method, it is proposed that the lateral acceleration is the only vehicle-movement dynamics characteristic variable. With respect to another embodiment, it is described that the lateral acceleration, the lateral acceleration, the change in the lateral acceleration over time, the attitude angle, the attitude-angle velocity, the change in the attitude-angle velocity over time and the slip angle are used as vehicle-movement dynamics characteristic variables. And, it is described that if one or more characteristic variables exceed the associated threshold values, the vehicle-movement dynamics control system brakes the wheels which are on the outside during cornering, such that they are placed in a high slip state. In the United States Patent, further described is "If the vehicle-movement-dynamics characteristic variables which are indicative of the tendency of the vehicle to tilt drop back below the associated tilting-prevention threshold values as a result of the vehicle-movement dynamics operating state which then arises, the braking of the wheels which are on the outside during cornering is reduced."

According to the method as described in the above United States Patent, it focused on a vehicle behavior during cornering, which is a motion about a longitudinal axis of the vehicle, to be classified as a rolling motion in view of a vehicle motion control, as described in a book entitled "Vehicle Dynamics and Control" written by Masato Abe, and published by Sankaido Co. Ltd., on May 31, 1994. On Page 3 of that book, the rolling motion has been classified as a motion which is basically created by a steering operation, together with a lateral motion of the vehicle, and a yawing motion about a vertical axis of the vehicle. And, it is described on Page 148 of the book that if a rolling moment acts on the vehicle, a roll angle will be caused about a roll center.

Referring to FIG. 14, will be explained an example of operation according to the method as described in the above United States Patent. In the case where the lateral acceleration is provided for the vehicle movement characteristic variable indicative of a roll increasing tendency of the vehicle, and (Gyo) is provided for a threshold value, for example, there is shown in FIG. 14 such a state that when the vehicle is moving straight, a steering wheel is rapidly steered by a vehicle driver to be turned to the left (from the time (t00) to the time (t03) in FIG. 14), then counter-steering of the steering wheel is made to be turned to the right (from the time (t03) to the time (t07)), and after being turned to the left (from the time (t07) to the time (t08)), the vehicle returns to the straight movement gradually (from the time (t08) to the time (t10)). In a lower section of FIG. 14, a characteristic for a front right wheel is indicated by (fr), and a characteristic for a front left wheel is indicated by (fl). In this case, at the outset, a clockwise rolling motion with respect to the moving direction of the vehicle is created on the vehicle, then a counter-clockwise rolling motion is created by the counter-steering of the steering wheel, and finally the clockwise rolling motion is created, to return to the straight movement.

As shown in FIG. 14, if the lateral acceleration exceeds the threshold value (Gyo), braking force is applied to a front wheel located at the outside of a curve during cornering operation of the vehicle (at the time (t01) and the time (t06)), whereas if it is equal to or smaller than the threshold value (Gyo), the braking force is reduced (at the time (t04) and the time (t09)). Therefore, the braking force applied to the front wheel located at the outside of the curve varies as shown in the lower section of FIG. 14. However, with the braking force being applied to the front wheel located at the outside of the curve, there might be a case where the rolling motion is affected. For example, if the braking force is applied to the front right wheel, the rolling motion will be created clockwise with respect to the moving direction of the vehicle. In this state, if the braking force is reduced, the rolling motion will be reduced to create the counter-clockwise rolling motion. Particularly, in such a case that the counter-steering is made to change the turning operation from the left to the right, as shown in FIG. 14 from the time (t03) to the time (t07), the braking force applied to the front right wheel is reduced, thereby to cause the counter-clockwise rolling motion, and thereafter the braking force is applied to the front left wheel, thereby to cause the further counter-clockwise rolling motion. This rolling motion resulted from increase and decrease of the braking force applied to the wheels will coincide with the rolling motion resulted from the turning (cornering) operation of the vehicle, in their directions, whereby discontinuity of the rolling motion might be caused.

SUMMARY OF THE INVENTION

Accordingly, it is an object of the present invention to provide a rolling motion stability control apparatus for restraining a roll increasing tendency of a vehicle to stabilize a rolling motion thereof, which is capable of achieving the rolling motion stability control smoothly, even in such a transient steering operation that the vehicle is turned in one direction, and then turned to the other direction.

In accomplishing the above and other objects, the rolling motion stability control apparatus includes a wheel brake device for applying braking force to each wheel of the vehicle, and a turning direction determination device for determining a turning direction of the vehicle. The apparatus further includes a first braking force control device for applying a first braking force to the wheel through the wheel brake device, when the turning direction determination device determines that the vehicle is turned to one direction of the vehicle, and a second braking force control device for applying a second braking force to the wheel through the wheel brake device, when the turning direction determination device determines that the vehicle is turned to the other direction of the vehicle. And, a terminating control adjustment device is provided for adjusting the braking force control devices to continue the first braking force being applied by the first braking force control device, until the second braking force is initiated to be applied by the second braking force control device, when the turning direction determination device determines that the vehicle is turned to the one direction, and then to the other direction.

Or, the apparatus may include a wheel brake device for applying braking force to each wheel of the vehicle, a turning direction determination device for determining a turning direction of the vehicle, a first braking force control device for applying a first braking force to the wheel through the wheel brake device, when the turning direction determination device determines that the vehicle is turned to one direction of the vehicle, and a second braking force control device for applying a second braking force to the wheel through the wheel brake device, when the turning direction determination device determines that the vehicle is turned to the other direction of the vehicle. And, a limitation device is provided for limiting an absolute value of a decreasing gradient of the first braking force to be smaller than a predetermined value, when at least the first braking force is reduced, wherein the predetermined value is set to continue the first braking force being applied by the first braking force control device, until the second braking force is initiated to be applied by the second braking force control device.

The turning direction of the vehicle may be determined on the basis of at least one of lateral acceleration, yaw velocity and steering angle of the vehicle.

BRIEF DESCRIPTION OF THE DRAWINGS

The above stated object and following description will become readily apparent with reference to the accompanying drawings, wherein like referenced numerals denote like elements, and in which:

FIG. 15 is a table showing roll state variables indicative of inputs of rolling motion according to an embodiment of the present invention.

DESCRIPTION OF THE PREFERRED EMBODIMENTS

Figure 1:
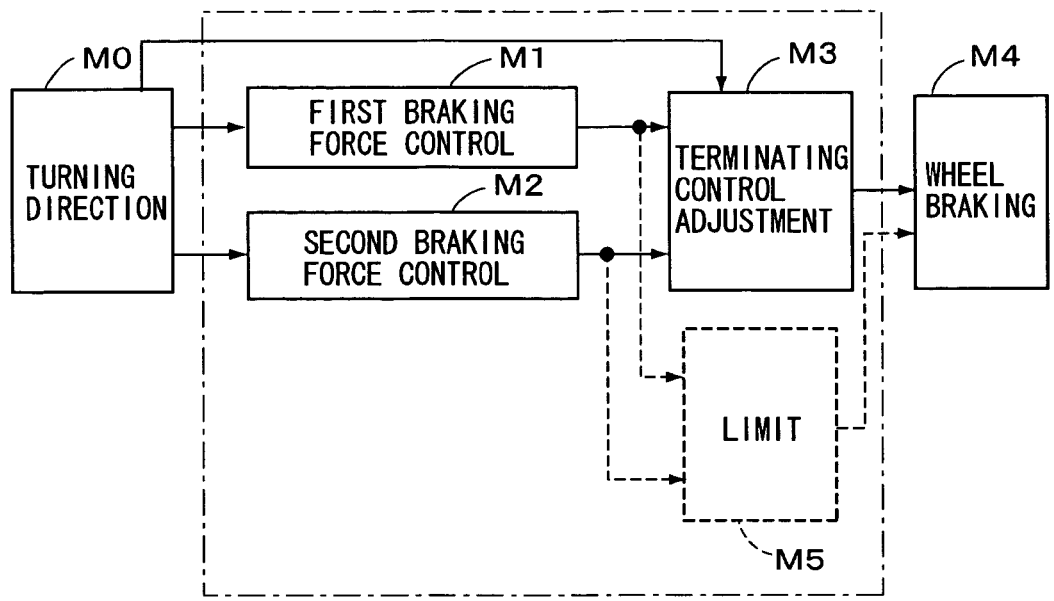
FIG. 1 is a schematic block diagram of a rolling motion stability control apparatus for a vehicle according to an embodiment of the present invention.

Referring to FIG. 1, there is schematically illustrated a rolling motion stability control apparatus for restraining a roll increasing tendency of a vehicle, with each wheel of the vehicle being braked by a wheel brake device M4, according to an embodiment of the present invention. The apparatus is provided with a turning direction determination device M0 for determining a turning direction of the vehicle, a first braking force control device M1 for applying a first braking force to the wheel through the wheel brake device M4, when the turning direction determination device M0 determines that the vehicle is turned to one direction of the vehicle, and a second braking force control device M2 for applying a second braking force to the wheel through the wheel brake device M4, when the turning direction determination device M0 determines that the vehicle is turned to the other direction of the vehicle. And, a terminating control adjustment device M3 is provided for adjusting the braking force control devices M1 and M2 to continue the first braking force being applied by the first braking force control device M1, until the second braking force is initiated to be applied by the second braking force control device M2, when the turning direction determination device M0 determines that the vehicle is turned to the one direction, and then to the other direction. The turning direction determination device M0 is constituted to determine the turning direction of the vehicle on the basis of a lateral acceleration of the vehicle, for example.

Accordingly, in such a transient steering operation that the vehicle is turned from one direction to the other direction, the roll-back of the rolling motion of the vehicle, which is caused by a change of the wheel to be controlled, can be restrained, thereby to achieve a smooth rolling motion stability control. Furthermore, as indicated by a broken line, a limitation device M5 may be provided for limiting an absolute value of a decreasing gradient of the first braking force to be smaller than a predetermined value, when at least the first braking force is reduced. The predetermined value is set to continue the first braking force being applied by the first braking force control device M1, until the second braking force is initiated to be applied by the second braking force control device M2. As a result, the decreasing gradient of the first braking force applied by the first braking force control device M1 is appropriately limited, to coincide with a characteristic of dynamic roll increasing tendency, as will be described later. Consequently, the rolling motion stability control can be achieved easily and smoothly.

Next will be explained the roll increasing tendency of the vehicle according to the present invention. The roll increasing tendency may be classified as the one which is caused by a rapid rolling motion (hereinafter, referred to as dynamic roll increasing tendency), the one which is caused by a relatively gradual rolling motion (hereinafter, static roll increasing tendency), and the one which has an intermediate characteristic between the dynamic roll increasing tendency and the static roll increasing tendency (hereinafter, intermediate roll increasing tendency). The dynamic roll increasing tendency is caused, provided that the rolling motion is rapidly increased, with the rapid steering operation or a reverse steering operation being made by a vehicle driver, and a suspension member abuts on a bound stopper to be compressed, so that a wheel, with the suspension member at a side thereof to be expanded, is forced to be lifted. The dynamic roll increasing tendency is likely to be caused in the case where the vehicle is turned to one direction and then turned to the other direction, i.e., during a so-called transient steering operation, rather than the case where the vehicle is moving straight and then rapidly turned. This is because the rolling motion has been created when the vehicle is steered to return from the one direction to the original position, so that the direction of the rolling motion will coincide with the created rolling motion when the vehicle is turned to the other direction, thereby to increase the rolling motion. Supposing that the vehicle is steered to return to the straight movement from the left turning operation, for example, the rolling motion is being created in the counter-clockwise direction with respect to the moving direction of the vehicle, whereas the rolling motion will be created further in the counter-clockwise direction, if the vehicle is steered to the right from the returned position.

Figure 2:
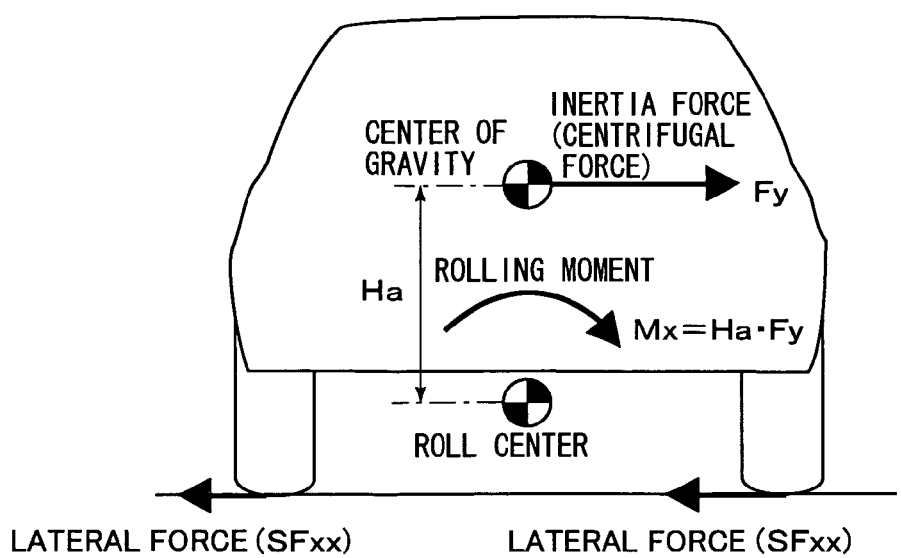
FIG. 2 is a diagram showing a relationship among state variables provided in a rolling motion of an ordinary vehicle.
Figure 3:
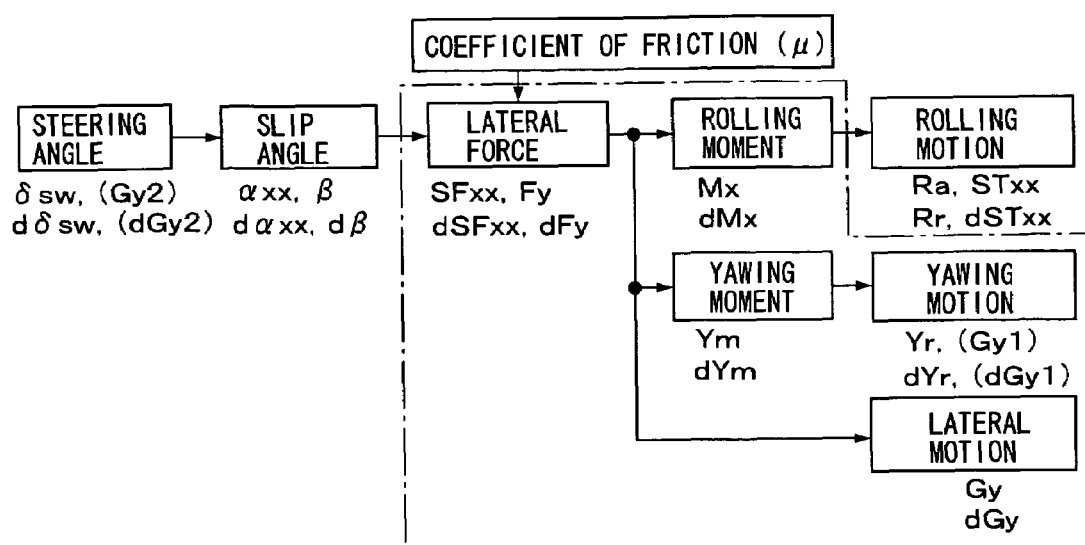
FIG. 3 is a block diagram showing state variables indicative of inputs of rolling motion of a vehicle according to the present invention.

Referring to FIGS. 2 and 3, will be explained the state variables of the vehicle rolling motion. With respect to the turning operation of the vehicle, a direction of the turning operation is indicated by a positive or negative sign. For example, a left turning operation is indicated by a positive sign, and a right turning operation is indicated by a negative sign. However, it is complicated to explain a comparison in magnitude, taking the signs into consideration. Therefore, the comparison in magnitude will be made on the basis of absolute values of them, hereinafter, unless they are defined specifically.

When a steering wheel (not shown) is operated by a vehicle driver, the vehicle is turned, with a slip angle ($\alpha xx$) produced on each wheel, and a lateral force (SFxx) produced on each wheel, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. In this case, an inertia force (centrifugal force) (Fy) acts on the gravity center of the vehicle, to balance with the lateral force produced on the wheel. However, the gravity center of the vehicle is not placed on the same position as the center of the rolling motion (i.e., roll center), so that there is a distance (Ha) between the gravity center and the roll center, to produce a rolling moment (Mx), i.e., (Mx)=(Ha)·(Fy). As a result, the rolling motion of the vehicle is created by the rolling moment, and if the rolling motion is excessive, it can be estimated that the vehicle is in the roll increasing tendency.

On the basis of the rolling motion dynamics as described above, a roll state variable (Rst) indicative of the rolling motion can be classified into an output state variable (Rot) indicative of an output (result) of the rolling motion, and an input state variable (Rin) indicative of an input (cause) of the rolling motion. As for the output state variable (Rot) relating to the output of the rolling motion, the roll angle (Ra) and roll velocity (Rr) are included. In view of movement of a suspension (not shown), a suspension stroke STxx and its velocity dSTxx are included, as well. Next, as for the input state variable (Rin) indicative of the input of the rolling motion, included are the steering wheel angle ($\delta sw$) of the steering wheel and steering wheel angular velocity ($d\delta sw$), wheel slip angle ($\alpha xx$) and its velocity ($d\alpha xx$), vehicle slip angle ($\beta$) and its velocity ($d\beta$), wheel lateral force (SFxx) and its variation in time (dSFxx), vehicle inertia force (Fy) and its variation in time (dFy), and also rolling moment (Mx) of the direct input of the rolling motion, and its variation in time (dMx). As the inertia force (the sum of lateral force for all wheels) corresponds to the vehicle lateral acceleration, a vehicle lateral acceleration (Gy) detected by a lateral acceleration sensor GY (described later) and its variation in time (dGy) can be included in the input state variable (Rin). Also, as the lateral force produces a yawing motion of the vehicle, a yawing moment (Ym) and its variation in time (dYm), yaw velocity (Yr) and its variation in time (yaw acceleration) (dYr) can be employed as the input state variable (Rin) of the rolling motion.

In this case, as the lateral acceleration of the vehicle can be indicated by other state variables, according to equations as described hereinafter, they may be used for the input state variable (Rin). First of all, an estimated lateral acceleration (Gy1) obtained by the yaw velocity (Yr) can be calculated according to the following equation (1):

$$Gy1 = V \cdot Yr \qquad (1)$$

where "V" is a vehicle speed.

Likewise, a variation in time (dGy1) of the estimated lateral acceleration (Gy1) can be calculated according to the following equation (2):

$$dGy1 = V \cdot dYr \qquad (2)$$

where "dYr" is a variation in time of the yaw velocity (Yr), i.e., yaw acceleration.

Then, an estimated lateral acceleration (Gy2) obtained by the steering wheel angle (d $\delta sw$) can be calculated according to the following equation (3):

$$Gy2 = [V^2/\{L \cdot (1+Kh \cdot V^2)\}] \cdot (\delta sw/N) \qquad (3)$$

where "L" is a wheel base, "Kh" is a stability factor, and "N" is a steering gear ratio.

Or, if Kh=0 (neutral steering) is used, the estimated lateral acceleration (Gy2) can be calculated according to the following equation (3'):

$$Gy2 = (V^2/L) \cdot (\delta sw/N) \qquad (3')$$

Likewise, a variation in time (dGy2) of the estimated lateral acceleration (Gy2) can be calculated according to the following equation (4):

$$dGy2=[V^2/\{L\cdot(1+Kh\cdot V^2)\}]\cdot(d\delta sw/N) \qquad (4)$$

where "dδsw" is a steering wheel angular velocity. Or, if Kh=0 (neutral steering) is used, the estimated lateral acceleration (Gy2) can be calculated according to the following equation (4'):

$$dGy2=(V^2/L)\cdot(d\delta sw/N) \qquad (4')$$

The roll state variable (Rst) indicative of the rolling motion as described above is classified as shown in FIG. 15, wherein the roll state variables are classified into the output (result) and input (cause), and wherein the roll input magnitude (Ram, Rm) indicative of magnitude of the input of the rolling motion, and the roll input velocity (Rsp, dRm) indicative of velocity of the input of the rolling motion are classified, separately. In FIG. 15, the state variables following an arrow as indicated in parentheses are those obtained through the calculations.

As the rolling motion is resulted from the turning operation of the vehicle, the direction or variation of turning operation of the vehicle can be determined on the basis of the sign of the vehicle state variable as shown in FIG. 15. That is, the direction of turning operation of the vehicle can be determined on the basis of the sign of either one of the state variables (Ram and Rm) indicative of the magnitude of the rolling motion. Furthermore, the variation of turning operation of the vehicle, i.e., whether the turning operation is being increased or decreased, can be determined on the basis of one of the sign of either one of the state variables (Ram and Rm) indicative of the magnitude of the rolling motion, and the sign of either one of the state variables (Rsp and dRm) indicative of the velocity of the rolling motion. In the case where the sign of the state variable indicative of the magnitude of the rolling motion is positive, during the left turning operation of the vehicle, for example, if the sign of the state variable indicative of the velocity of the rolling motion is positive, so that their signs coincide with each other, it is determined that the vehicle is turning to the left, and the turning operation is being increased. On the contrary, if the sign of the state variable indicative of the velocity of the rolling motion is negative, so that their signs do not coincide with each other, it is determined that the vehicle is turning to the left, and the turning operation is being decreased.

Figure 4:
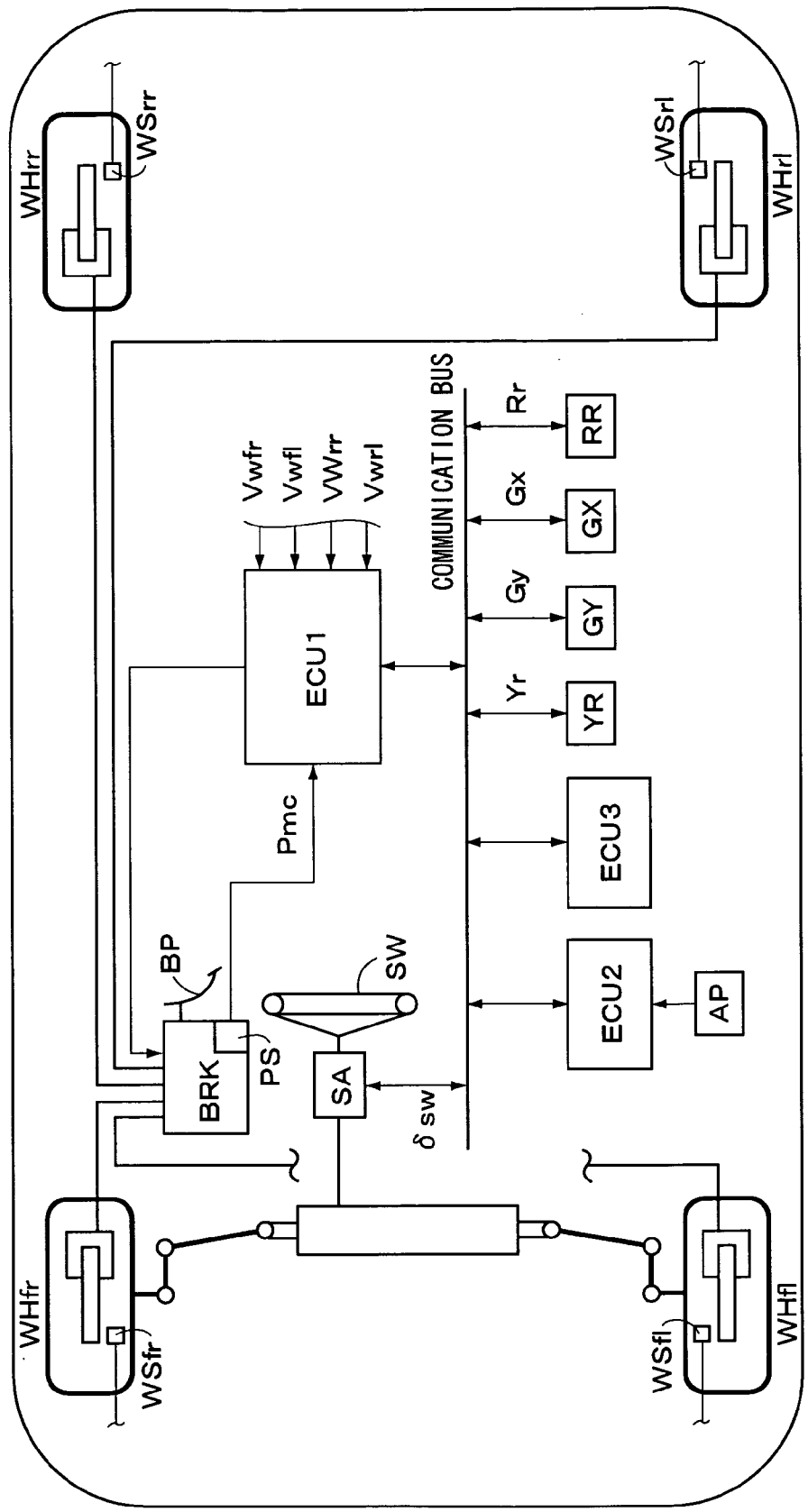
FIG. 4 is a schematic block diagram of a vehicle having a rolling motion stability control apparatus according to an embodiment of the present invention.

Referring to FIG. 4, there is schematically illustrated an overall structure of a vehicle with the vehicle motion stability control apparatus according to an embodiment of the present invention. A brake system electronic control unit ECU1, engine system electronic control unit ECU2, and instrument panel electronic control unit ECU3 are connected to one another through a communication bus, so that the information for each control unit can be fed from other control units. Furthermore, there are provided a steering angle sensor SA for detecting the steering angle (δsw) of a steering wheel SW, a longitudinal acceleration sensor GX for detecting a vehicle longitudinal acceleration (Gx), a lateral acceleration sensor GY for detecting a vehicle lateral acceleration (Gy), a yaw rate sensor YR for detecting a yaw rate (Yr) of the vehicle, and a roll velocity sensor RR for detecting a roll velocity (Rr) of the vehicle, which are electrically connected to each electronic control unit to supply thereto the sensor signals. A brake actuator BRK is provided for applying a braking force to each wheel in response to depression of a brake pedal BP of the vehicle driver, and controlling the braking force on each wheel independently in response to a signal from the electronic control unit ECU1, when the rolling motion stability control is required, as described later. A pressure sensor PS is provided in the brake actuator BRK for detecting an amount of operation of the brake pedal BP by the vehicle driver, to feed its detected pressure (Pmc) to the brake system electronic control unit ECU1. The braking force control for the rolling motion stability control can be performed, even in the case where the vehicle driver is not operating the brake pedal BP.

As shown in FIG. 4, at each wheel WHxx of the vehicle, there is provided a wheel speed sensor WSxx, which is connected to the electronic control unit ECU1. And, a signal having pulses proportional to a rotational speed of each wheel, i.e., a wheel speed signal is fed to the electronic control unit ECU1, wherein a vehicle speed (V) in the longitudinal direction of the vehicle is calculated on the basis of wheel speed signals (Vwxx) fed from the wheel speed sensors WSxx. The amount of operation (Ap) of an accelerator pedal (not shown) is detected by an accelerator pedal sensor AP, and fed to the electronic control unit ECU1 through the communication bus as described before.

According to the present embodiment, the vehicle rolling motion stability control is performed in the brake system electronic control unit ECU1. When the vehicle rolling motion stability control starts, the braking force applied to each wheel is controlled independently, so as to restrain the vehicle roll increasing tendency. Furthermore, signals for controlling the driving force applied to the wheel are fed to the engine system electronic control unit ECU2 through the communication bus, so as to reduce engine torque by controlling a throttle opening, ignition timing, amount of fuel to be injected and so on, and control the driving force applied to the wheel. At the same time, notification signals are fed to the instrument panel electronic control unit ECU3 through the communication bus, so as to actuate a visible or audible annunciator (not shown) for notifying the vehicle driver of the vehicle state.

Figure 5:
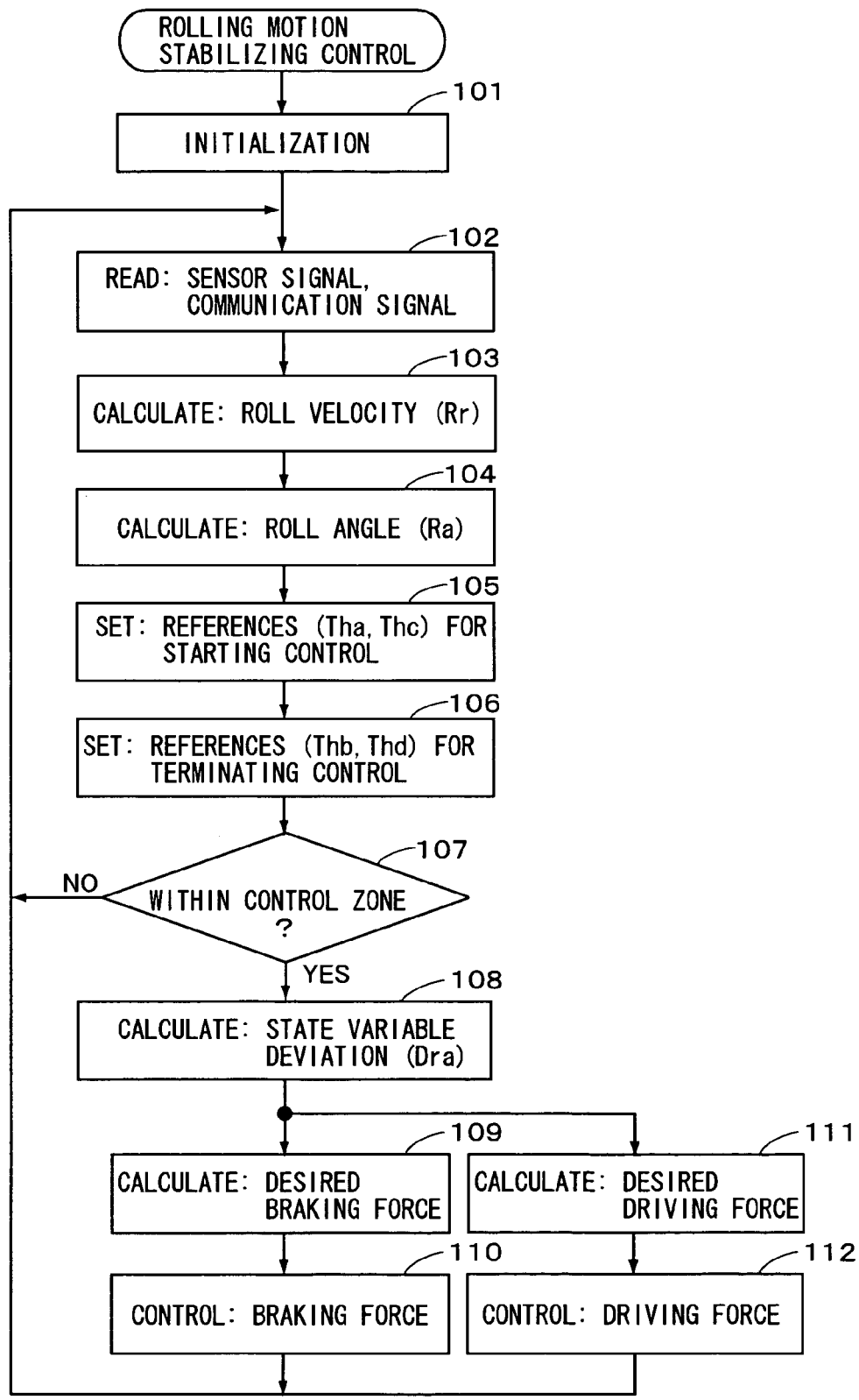
FIG. 5 is a flowchart for an example of a rolling motion stability control according to an embodiment of the present invention.

Referring to FIG. 5, the rolling motion stability control according to the present embodiment will be performed as follows. As for the state variables, the roll angle (Ra) and roll velocity (Rr) are used in the present embodiment. However, instead of the roll angle (Ra), may be used at least one of the state variables (Ram and Rm) indicative of magnitude of the rolling motion, and instead of the roll velocity (Rr), may be used at least one of the state variables (Rsp and dRm) indicative of velocity of the rolling motion. In FIG. 5, at the outset, the program provides for initialization of the system at Step 101, and the signals detected by various sensors and communication signals are read at Step 102. Then, the program proceeds to Step 103, where the roll velocity (Rr) is calculated on the basis of the signal detected by the roll velocity sensor RR, and further proceeds to Step 104, where the roll velocity (Rr) is integrated to provide the roll angle (Ra) at Step 104. Then, the turning direction and variation of the turning state can be determined by the signs (positive or negative) of the roll angle (Ra) and the roll velocity (Rr).

Next, references for starting the control (Tha and Thc, for the left turn and right turn, respectively) are set at Step 105, and references for terminating the control (Thb and Thd, for the left turn and right turn, respectively) are set at Step 106. The references for terminating the control (Thb and Thd) are changed on the basis of the roll angle (Ra) and the roll velocity (Rr) to be reset, as will be described later. Then, the present roll angle (Ra) is compared with the reference (Tha) or (Thc) for starting the control, and the reference (Thb) or (Thd) for terminating the control, to determine whether it is within a control zone. In this respect, the control zone is a zone wherein the braking force control and driving force control are required to stabilize the rolling motion of the vehicle. If it is determined at Step 107 that it is outside of the control zone, the program returns to Step 102, without the braking force control and driving force control being performed. On the contrary, if it is determined that it is within the control zone, the program proceeds to Step 108, where a deviation between the roll angle (Ra) and the reference (Tha) or (Thc) for starting the control, or the reference (Thb) or (Thd) for terminating the control is calculated, to provide a state variable deviation (Dra). Accordingly, the program proceeds to Step 109 where a desired braking force (BFdxx) is calculated for each wheel on the basis of the state variable deviation (Dra). And, the brake actuator BRK is controlled in response to the desired braking force (BFdxx) at Step 110. When the desired braking force (BFdxx) is calculated, may be considered the amount of operation of the brake pedal BP made by the vehicle driver, e.g., master cylinder pressure to be input as a detected pressure (Pmc). Likewise, a desired driving force is calculated at Step 111 on the basis of the state variable deviation (Dra), so that the amount of engine torque to be reduced is determined. Then, an engine system actuator (not shown) is actuated at Step 112 to control the throttle opening, ignition timing, amount of fuel to be injected and so on. When the desired driving force is calculated, may be considered the amount of operation of the accelerator pedal AP made by the vehicle driver.

Figure 6:
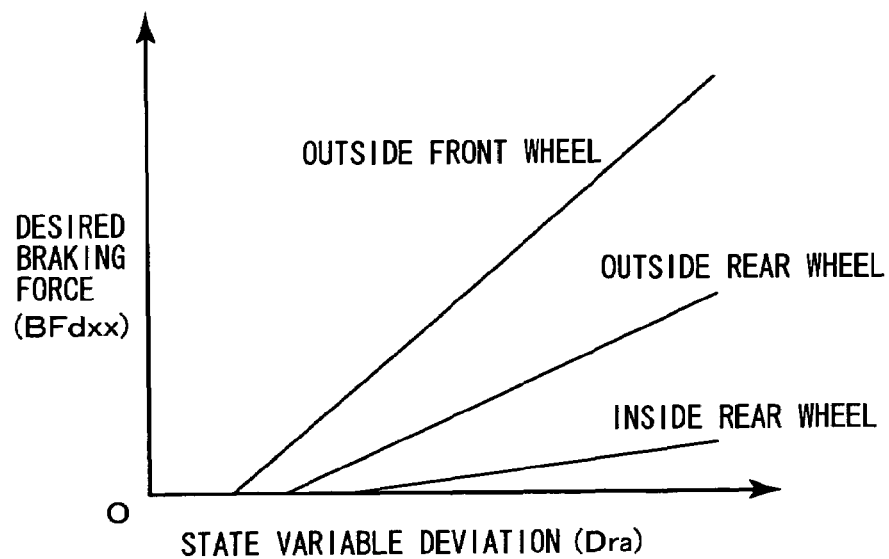
FIG. 6 is a diagram showing an example of a map for calculating a desired braking force provided for each wheel of a front wheel located on the outside of a curve during cornering operation of a vehicle, a rear wheel located on the outside of the curve, and a rear wheel located on the inside of the curve, on the basis of a state variable deviation, according to an embodiment of the present invention.

The desired braking force (BFdxx) obtained at Step 109 in FIG. 5 is calculated on the basis of the state variable deviation (Dra) obtained at Step 108, to provide the desired braking force (BFdxx) for each wheel as shown in FIG. 6. That is, in order to restrain the roll increasing tendency of the vehicle with an appropriate yawing moment being maintained, calculated is the desired braking force (BFdxx) for each wheel of a front wheel located on the outside of a curve in the vehicle's path during cornering operation of the vehicle, a rear wheel located on the outside of the curve, and rear wheel located on the inside of the curve, on the basis of the state variable deviation (Dra). In order to reduce the vehicle speed rapidly, with the appropriate yawing moment being maintained, one wheel or plurality of wheels may be selected as the wheel to be controlled. For example, it is effective to apply the braking force to all of four wheels, one wheel of the front wheel located on the outside of the curve during cornering operation of the vehicle, two front wheels and the rear wheel located on the inside of the curve, or two front wheels and the rear wheel located on the outside of the curve.

Figure 7:
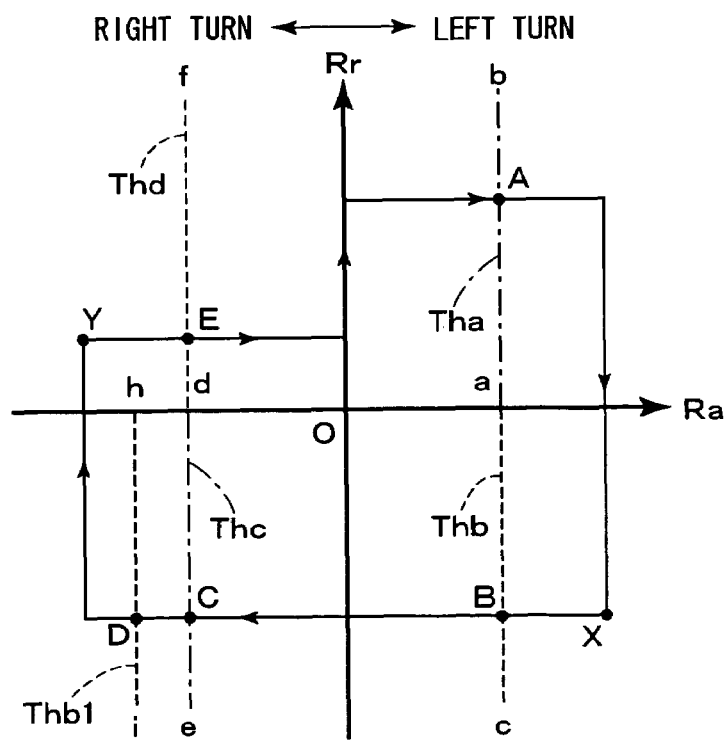
FIG. 7 is a diagram showing an example of a control map including references for estimating a roll increasing tendency according to an embodiment of the present invention.

Next, referring to FIG. 7, will be explained the reference for starting the control, reference for terminating the control, start and termination of the control, which are executed at Steps 105–108, respectively. FIG. 7 shows an example of the rolling motion of the vehicle on a state variable plane with the roll angle (Ra) and roll velocity (Rr), wherein the rolling motion begins at the origin (0) and traces arrows as indicated. That is, provided is such a rolling motion that the vehicle is moving straight and rapidly steered to provide the left turning operation, then steered reversely to provide the right turning operation, and finally returns to the straight movement gradually. At the outset, when the vehicle is moving straight, the roll angle (Ra) and roll velocity (Rr) are not created, to be placed at the origin (0). Then, with the left turning operation being performed, the roll velocity (Rr) is created, and the roll angle (Ra) is increased. When the rolling motion crosses at a point (A) the reference (Tha) for starting the control, which is provided at Step 105, in the form of a line segment (a–b) as indicated by one-dot chain line in FIG. 7, the rolling motion is fallen within the control zone. The distance between the actual roll angle and the reference (Tha), i.e., the line segment (a–b), is calculated to provide the state variable deviation (Dra). The reference (Tha) for starting the control is set in advance on the basis of the vehicle dimensions or the like, or may be set according to the vehicle states such as the vehicle speed. The reference (Thb) for terminating the control, i.e., the line segment (a–c), is provided in the same manner as the reference (Tha), and set to be slightly smaller than the reference (Tha), so as to avoid a control hunting.

When the steering wheel SW is steered reversely by the vehicle driver from the left turning operation to the right turning operation, the roll velocity (Rr) comes to be of a negative value, so that the rolling motion is fallen within the fourth quadrant on the state variable plane as shown in FIG. 7. In this case, if the signs (positive or negative) of the roll angle (Ra) and roll velocity (Rr) do not coincide with each other, at a point (X) for example, and the absolute value of the roll velocity (Rr) is larger than the predetermined value, it is determined that the turning direction of the vehicle is shifted from the left (one direction) to the right (the other direction), so that the reference for terminating the control is changed from (Thb), i.e., the line segment (a–c), to (Thb1), i.e., the line segment (h–i). The changed reference (Thb1) is set to be larger in its absolute value than the reference (Thc) for starting the control in the reverse direction (right turning operation). As a result, the braking force control for the left turning operation is maintained until the braking force control for the reverse (right) turning operation is initiated, and the braking force control for the left turning operation is terminated after the reverse (right) turning operation was initiated. In FIG. 7, the braking force control for the right turning operation is initiated at a point (C), and the braking force control for the left turning operation is terminated at a point (D).

On the other hand, when the vehicle is shifted from the right turning operation to the straight movement, the steering wheel SW is gradually steered by the vehicle driver reversely to the original state, the roll velocity (Rr) will not be made so large. Although the signs (positive or negative) of the roll angle (Ra) and roll velocity (Rr) do not coincide with each other at a point (Y), for example, the roll velocity (Rr) is smaller than the predetermined value. Therefore, it is not determined that the turning direction of the vehicle is shifted from the right to the left, so that the reference (Thd) for terminating the control, i.e., the line segment (d–f), will not be changed in the manner as described above. With the roll angle (Ra) being reduced, the braking force control for the left turning operation will be terminated, at a point (E) where the rolling motion crosses the reference (Thd) for terminating the control.

Figure 8:
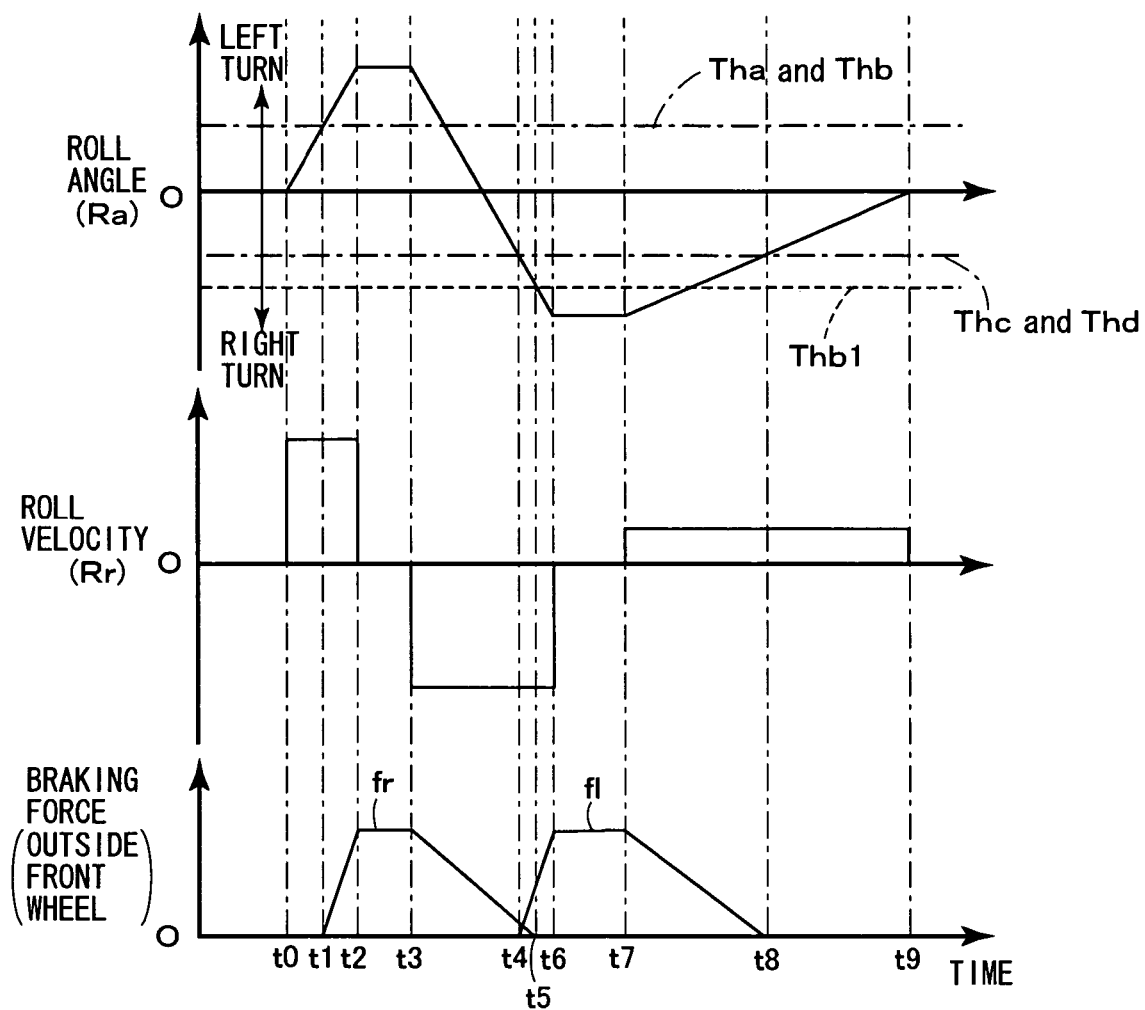
FIG. 8 is a time chart showing a control state using a control map as shown in FIG. 7 according to an embodiment of the present invention.

Next will be explained the operation of the apparatus as shown in FIGS. 5–7, referring to FIG. 8, which shows the same turning state as shown in FIG. 7, without the braking operation being made by the vehicle driver. In FIG. 8, there is shown an example wherein the braking force is applied to the front wheel located at the outside of the curve during cornering operation of the vehicle, which wheel is most effective to stabilize the rolling motion, but other wheels may be controlled in the same manner. In FIG. 8, shown on its upper section is the roll angle (Ra), which is varied when the vehicle is moving straight and rapidly steered to provide the left turning operation, then steered reversely to provide the right turning operation, and finally returns to the straight movement gradually, in the same manner as shown in FIG. 7. And, the middle section of FIG. 8 shows the roll velocity (Rr) created in the operation corresponding to that on the upper section, and the lower section of FIG. 8 shows a variation of the braking force applied to the front wheel located at the outside of the curve during cornering operation of the vehicle, as a representative example of the braking force control.

In FIG. 8, when the roll angle (Ra) is increased to be larger than the control reference (Tha) for starting the control of the left turning operation, the braking force control is initiated, so that the braking force applied to the front right wheel corresponding to the front wheel located at the outside of the curve during the left turning operation begins to be increased at the time (t1). At the outset, the reference (Thb) for terminating the control has been set to be slightly smaller than the control reference (Tha) for starting the control. At this time, however, the signs (positive or negative) of the roll angle (Ra) and roll velocity (Rr) do not coincide with each other, and the absolute value of the roll velocity (Rr) is larger than the predetermined value, so that the reference for terminating the control is changed into the reference (Thb1), the absolute value of which is set to be larger than that of the reference (Thc) for starting the control of the right turning operation.

Next, in the case where the steering wheel SW is steered reversely by the vehicle driver from the left turning operation to the right turning operation, when the absolute value of the roll velocity (Rr) exceeds the reference (Thc) for starting the control, the braking force control for the right turning operation is initiated, so that the braking force applied to the front left wheel begins to be increased at the time (t4). In this case, with respect to the front right wheel with the braking force applied thereto being controlled for the left turning operation, the roll angle (Ra) has not reached the changed reference (Thb1) for terminating the control, so that the braking force will not become zero. Then, if the roll angle (Ra) reaches the changed reference (Thb1), the braking force applied to the front right wheel will become zero at the time (t5). When the vehicle is steered to return to the straight movement from the left turning operation, the roll velocity (Rr) is not large enough to change the reference (Thd) for terminating the control. Therefore, at the time (t8) when it will reach the reference (Thd) for terminating the control, the braking force control for the front left wheel will be terminated, so that the braking force will become zero.

With respect to the braking force applied to the front wheel located at the outside of the curve, therefore, the control for the left turning operation is initiated at the time (t1), the braking force applied to the front right wheel is increased, as shown in the lower section of FIG. 8, to provide a characteristic (fr). And, as the absolute value of the roll velocity (Rr), which is caused when the steering wheel SW is steered by the vehicle driver from the left turning operation to the right turning operation, is relatively large, the reference for terminating the control is changed from (Thb) to (Thb1). The changed reference (Thb1) is set to be larger in its absolute value than the reference (Thc) for starting the control of the right turning operation (reverse direction). Therefore, after the braking force was applied to the front left wheel to be controlled in the right turning operation, the braking force applied to the front right wheel to be controlled in the left turning operation comes to be zero.

As described above, in the case where the steering wheel SW is rapidly steered by the vehicle driver reversely from one direction to the other direction, if the signs (positive or negative) of the state variables indicative of magnitude and velocity of the rolling motion do not coincide with each other, and the state variable (Rsp or dRm) indicative of velocity of the rolling motion is relatively large, it is determined that the turning direction of the vehicle is shifted from one direction to the other direction, so that the reference for terminating the control is changed to be larger in its absolute value than the reference for starting the control in the other direction. As a result, the braking force control for the turning direction in the other direction is initiated, before the braking force control for the turning direction in the one direction is terminated. Consequently, the change of the rolling motion resulted from increase and decrease of the braking force can be restrained, thereby to achieve the rolling motion stability control smoothly.

According to the above-described embodiment, the roll increasing tendency is estimated on the basis of the roll angle (Ra) and roll velocity (Rr) as variables, which are the state variables resulted from the rolling motion (i.e., outputs), so that detection means such as a roll velocity sensor, suspension stroke sensor or the like. Therefore, hereinafter will be explained another embodiment for performing an easier and smooth rolling motion stability control, without requiring the roll velocity sensor or the like. First of all, instead of the outputs of the rolling motion such as roll angle (Ra) and roll velocity (Rr), the roll increasing tendency can be estimated, by the state variables indicative of inputs of the rolling motion, i.e., input state variable (Rin). In the case where the roll increasing tendency is estimated on the basis of the input state variable (Rin), the detection means such as the roll velocity sensor or the like is not necessary, but may be used components of an Electronic Stability Control (abbreviated as ESC), which is beneficial in cost. And, by limiting a decreasing gradient for the braking force control, i.e., variation in time of decrease of the braking force, the same effect as described before can be achieved, without changing the reference for terminating the control.

Figure 9:
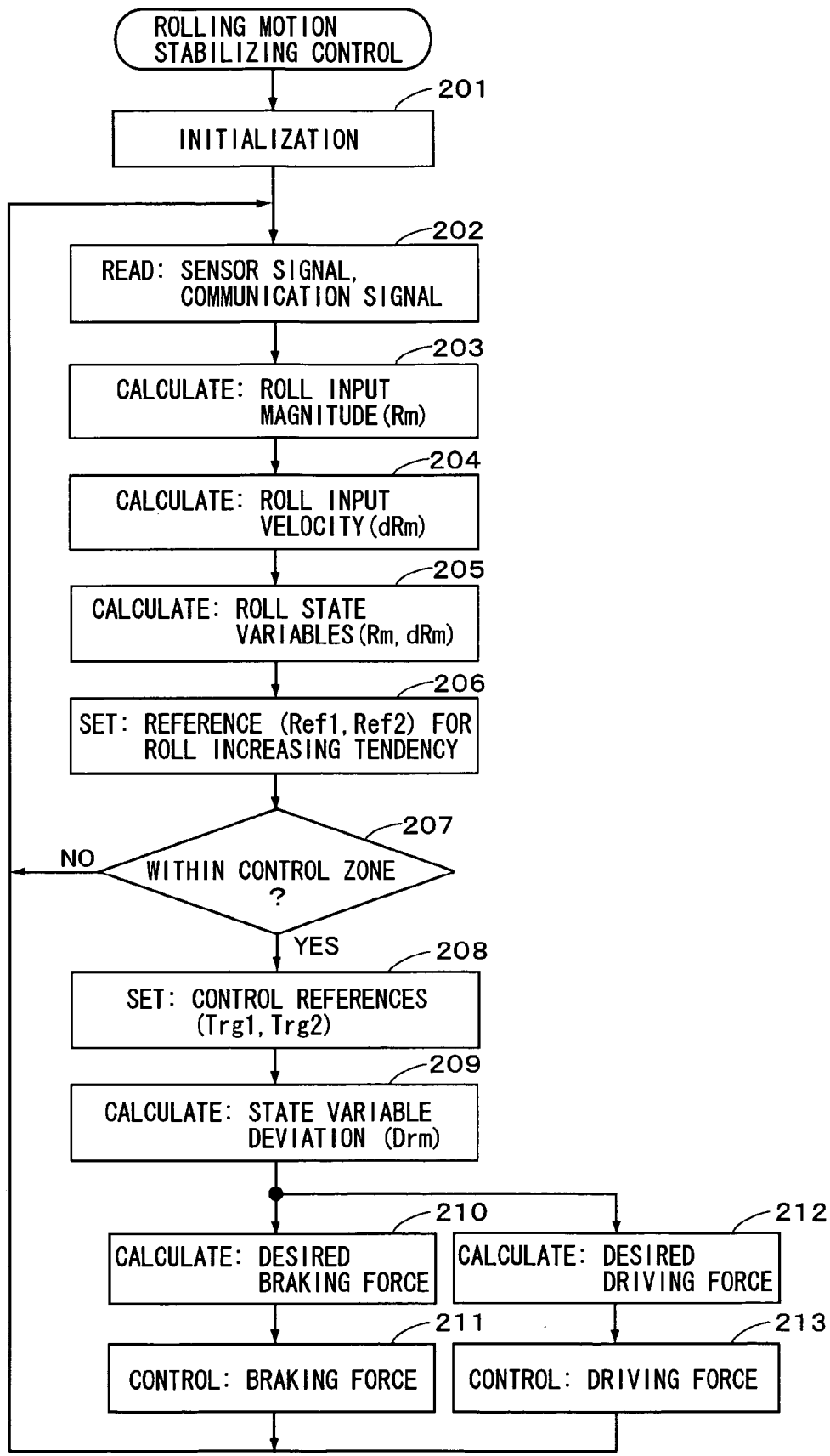
FIG. 9 is a flowchart for an example of a rolling motion stability control according to another embodiment of the present invention.

In FIG. 9, the program provides for initialization of the system at Step 201, and the signals detected by various sensors and communication signals are read at Step 202. Then the program proceeds to Step 203, where the roll input magnitude (Rm) indicative of magnitude of the input of the rolling motion is calculated, and further proceeds to Step 204, where the roll input velocity (dRm) indicative of velocity of the input of the rolling motion is calculated. The roll input magnitude (Rm) and roll input velocity (dRm) are the state variables as shown in FIG. 15, each of which can be calculated by known methods. The direction of turning operation of the vehicle and the variation of turning operation of the vehicle can be determined on the basis of the signs of the roll input magnitude (Rm) and the roll input velocity (dRm), as described before. At Step 205, therefore, the state variable indicative of the input of actual rolling motion, i.e., roll state variable, is indicated by (Rm, dRm), with the roll input magnitude (Rm) and the roll input velocity (dRm) being employed as variables. Next, reference characteristics for use in estimating the vehicle roll increasing tendency are set at Step 206, to provide references (Reg1 and Reg2) for estimating the roll increasing tendency, i.e., references for determining the left turn and right turn. The references (Reg1 and Reg2) are set in advance on the basis of the vehicle dimensions or the like, or may be set according to vehicle states such as the vehicle speed. And, the references (Reg1 and Reg2) are initially set to be of the same characteristic.

Then, it is determined at Step 207 whether the roll state variable (Rm, dRm) is within a control zone, relative to the references (Ref1 and Ref2) for estimating the roll increasing tendency. If it is determined at Step 207 that the roll state variable (Rm, dRm) is outside of the control zone relative to the reference (Ref1 or Ref2) for estimating the roll increasing tendency, the program returns to Step 202, without the braking force control and driving force control being performed. On the contrary, if it is determined that the roll state variable (Rm, dRm) is within the control zone, the program proceeds to Step 208, where control references (Trg1 and Trg2) for controlling the braking force control and driving force control are provided. Then, the state variable deviation (Drm) is calculated at Step 209 on the basis of the roll input magnitude (Rm) and the control references (Trg1 and Trg2). Accordingly, the program proceeds to Step 210 where the desired braking force (BFdxx) is calculated for each wheel on the basis of the state variable deviation (Drm). And, the brake actuator BRK is controlled in response to the desired braking force (BFdxx) at Step 211. Likewise, a desired driving force is calculated at Step 212 on the basis of the state variable deviation (Drm), so that the amount of engine torque to be reduced is determined. Then, an engine system actuator (not shown) is actuated at Step 213 to control the throttle opening, ignition timing, amount of fuel to be injected and so on. With respect to the braking force control, limitation is provided, as will be described later.

Figure 10:
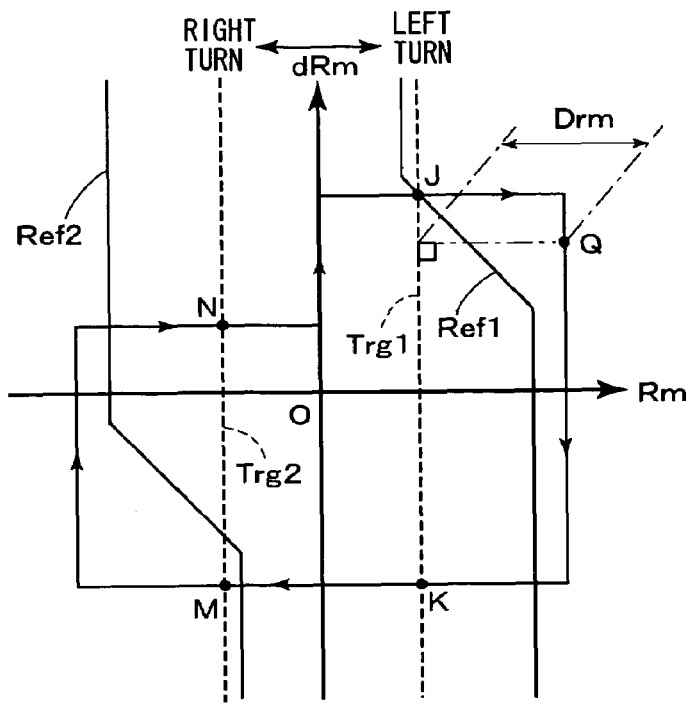
FIG. 10 is a diagram showing an example of operation using a control map according to another embodiment of the present invention.

Next, referring to FIG. 10, will be explained determination of the state variable being fallen in the control zone, provision of control references (Trg1 and Trg2), and start and termination of the control, which are executed at Steps 207–209, respectively. With respect to the rolling motion of the vehicle, the vehicle is moving straight and rapidly steered to provide the left turning operation, then steered reversely to provide the right turning operation, and finally returns to the straight movement gradually, in the same manner as the embodiment as shown in FIGS. 7 and 8. In this case, the braking operation is not made by the vehicle driver, and the rolling motion starts at the origin (0) and traces arrows as indicated in FIG. 10. At the outset, the vehicle is moving straight, so that the roll input magnitude (Rm) is zero. With the steering wheel SW being steered by the vehicle driver, the roll input magnitude (Rm) and roll input velocity (dRm) are increased. When a locus of the roll state variable (Rm, dRm) crosses a reference (Ref1) for estimating the roll increasing tendency for the left turning operation in a direction to be increased, i.e., at a point (J) where a relationship of (Rm>Ref1) is made, the roll input magnitude (Rm) is set to be the control reference (Trg1). A control reference (Trg2) for the turning operation in a reverse direction (right turning operation in FIG. 10) is provided to be symmetrical relative to the control reference (Trg1), about the origin (0).

With respect to the braking force control for the rolling motion stability control, the start and termination of the control are determined on the basis of the control references (Trg1 and Trg2). The desired value (BFxx) of braking force applied to the wheel through the braking force control is provided by the equation of (BFxx=Kbf·Drm), wherein "Kbf" is a coefficient. The state variable deviation (Drm) is calculated as a distance between the actual roll state variable and the control references (Trg1 and Trg2). For example, it can be obtained as the distance (Drm) extending from a point (Q) in FIG. 10 to the control reference (Trg1). And, the actual braking force applied to the wheel is controlled on the basis of the desired braking force (BFxx). With the roll input magnitude being decreased by the steering operation of the vehicle driver, the rolling motion of the vehicle begins to be decreased. At a point (K) where the locus of the roll state variable (Rm, dRm) crosses the control reference (Trg1), the control for the left turning operation is terminated. With respect to the braking force control, however, the variation in time of decrease of the braking force actually applied to the wheel, i.e., decreasing gradient of the braking force, is limited not to be lower than a predetermined value. Therefore, the braking force control is terminated at the point (K), so that the desired value of the braking force come to be zero, whereas the decreasing gradient of the actual braking force has been limited, so that the braking force is still being actually applied to the wheel. In the case where the vehicle is steered reversely from the left turn to the right turn, to increase the roll input magnitude (Rm) for the right turning operation. When it crosses the control reference (Trg2) for the right turning operation at a point (M) in a direction to be increased, the braking force control is initiated for the right turning operation. As a result, the rolling motion is decreased to cross the control reference (Trg2) in a direction to be decreased, whereby the braking force control for the left turning operation is terminated, so that the desired value of the braking force comes to be zero. In this case, although the decreasing gradient of the braking force has been limited as in the same manner as described above, if the decreasing gradient of the desired braking force is so gradual that the limiting condition is not fulfilled, the actual braking force to be reduced will not be limited.

Figure 11:
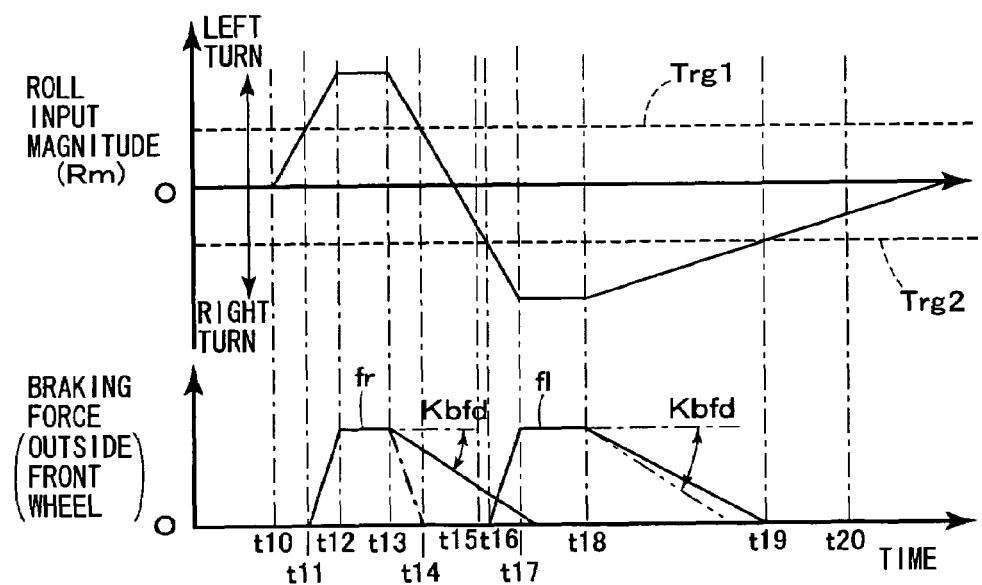
FIG. 11 is a time chart showing a control state using a control map as shown in FIG. 10 according to another embodiment of the present invention.

FIG. 11 is a time chart showing the operation of the apparatus as shown in FIG. 10, wherein the steering condition and braking condition operated by the vehicle driver are the same as those explained in FIG. 8. In FIG. 11, illustrated is variation in time of the braking force applied to the front wheel located at the outside of the curve during cornering operation of the vehicle, which wheel is most effective to stabilize the rolling motion, while the braking force control is not limited to that wheel. At the outset, if the roll state variable (Rm, dRm) for the left turning operation of the vehicle crosses the reference (Ref1) for estimating the roll increasing tendency as shown in FIG. 10 in a direction to be increased, i.e., if the roll state variable exceeds the reference (Ref1), it is fallen within the control zone, and the roll input magnitude (Rm) at this time is set to be the control reference (Trg1) for the left turning operation. And, the control reference (Trg2=−Trg1) for the right turning operation is provided to be symmetrical relative to the control reference (Trg1), about the origin (0). And, the state variable deviation (Drm) between the roll input magnitude (Rm) and the control references (Trg1) is calculated by the equation (Drm=Rm−Trg1). Then, the desired braking force (BFxx) is provided by the equation of (BFxx=Kbf Drm), wherein "Kbf" is a coefficient. On the basis of the desired braking force (BFxx), the actual braking force applied to the wheel is controlled, to increase the braking force applied to the front wheel located at the outside of the curve (i.e., front right wheel in the left turning operation) at the time (t11) in FIG. 11.

When the roll input magnitude (Rm) is decreased to be lower than the control reference (Trg1), the braking force control for the rolling motion in the left turning operation is terminated, so that the desired braking force (BFxx) comes to be zero at the time (t14), as indicated by a thick one-dot chain line in FIG. 11. With respect to the braking force control, however, the decreasing gradient of the braking force is limited to be smaller than a predetermined value (Kbfd), i.e., |dBf/dt|<Kbfd, to provide an upper limit (Kbfd). Therefore, actual braking force is still being applied at the time (t14), as indicated by a solid line in FIG. 11, while it is decreasing. In this case, the vehicle is shifted from the left turning operation to the right turning operation, because the steering wheel SW has been steered reversely. Then, if the roll state variable exceeds the control reference (Trg2) for the right turning operation, the braking force applied to the front left wheel located at the outside of the curve for the rolling motion in the right turning operation begins to be increased at the time (t16). In this case, as the decreasing gradient of the braking force has been limited, the braking force is being applied to the front right wheel. Thus, before the braking force is applied to the front left wheel through the braking force control in the right turning operation, the braking force applied to the front right wheel through the braking force control in the left turning operation has been remained. Consequently, the rolling motion resulted from a repetition of increase and decrease of the braking force is restrained, to achieve the rolling motion stability control smoothly.

After the time (t18) in FIG. 11, the vehicle is gradually returned to be in its straight movement from the right turning operation. In this case, the variation of the roll input magnitude (Rm) is gradual, and also the variation of the state variable deviation (Drm) is gradual, so that the variation in time of decrease of the desired braking force (BFxx) is smaller than the upper limit (Kbfd). In this case, therefore, the actual braking force is decreased, without being limited by conditions of the decreasing gradient of the braking force.

When the turning direction of the vehicle is shifted from one direction to the other direction, caused is such a phenomenon that the roll increasing tendency is largely created, in the case where the rolling motion is rapid, i.e., in the case where the steering angular velocity (dδsw) of the steering wheel SW is relatively large. In the case where the rolling motion is rapid, therefore, the decreasing gradient of the actual braking force is made to be gradual, by providing the limitation to the decreasing gradient of the braking force. In the case where the rolling motion is slow, however, no limit is provided for the decreasing gradient. With respect to the upper limit (Kbfd) for limiting the decreasing gradient of the braking force, therefore, its value is so provided that the limitation to the decreasing gradient is applied when the rolling motion is rapid, and the braking force provided for the turning operation in one direction is maintained, until the braking force provided for the turning operation in the other direction will begin to be applied. The value of the upper limit (Kbfd) is obtained experimentally on the basis of the vehicle dimensions or the like, and may be varied in response to the vehicle speed.

With the decreasing gradient of the braking force being limited as described above, it is not required to modify the control reference as explained with reference to FIGS. 5–8. As the limitation to the decreasing gradient coincides with the characteristic of the roll increasing tendency in case of the transient steering operation, the rolling motion stability control can be made smoothly. Instead of providing the limitation to the decreasing gradient of the actual braking force, may be provided a limitation to the decreasing gradient of the desired braking force, when the desired braking force is set as a target for the braking force control. Instead of performing the braking force control on the basis of the roll input magnitude (Rm) and roll input velocity (dRm) used as the roll state variables (Rst), it may be so constituted to perform the braking force control on the basis of at least one of the roll state variables (Rst) as shown in FIG. 15, and provide the limitation to the decreasing gradient of the actual braking force.

In order to respond the dynamic roll increasing tendency, it is advantageous to employ the state variable obtained as early as possible. Therefore, it is desirable to use the state variable obtained on the basis of the steering angle (δsw) of the steering wheel SW, which is the first input of the rolling motion, out of the plurality of state variables as shown in FIG. 3. That is, the steering angular velocity (dδsw), or variation in time of the estimated lateral acceleration (dGy2) calculated from the steering angle (δsw) is appropriate for the roll input velocity (dRm). When estimating the roll increasing tendency of the vehicle, not only the early estimation but also certain estimation based on the road surface condition are required. Therefore, it is desirable for the roll input magnitude (Rm) to use the state variables reflecting the result from a road coefficient of friction (μ), which include the lateral acceleration (Gy), yaw velocity (Yr), or the state variable obtained thereby. These are the state variables indicative of the vehicle behavior in a lateral direction or yaw direction, which are resulted from the lateral force created on each wheel, as apparent from the fact that the state variables are classified in such a region as shown at the right side from lateral force in FIG. 3.

The lateral acceleration (Gy), yaw velocity (Yr), and the state variable provided thereby are the state variables, which are resulted from operation of the steering wheel SW, but which are obtained later in time than the state variables obtained on the basis of the steering angle (δsw) of the steering wheel SW. However, they reflect the road surface condition, to provide a certain and robust state variable, and they are effective for a relatively gradual vehicle behavior such as the static roll increasing tendency. Therefore, the state variables obtained by the vehicle behavior in the lateral direction or yaw direction, which reflects the result from the road coefficient of friction (μ), may be used for the roll input magnitude (Rm), to achieve a certain and robust estimation of the roll increasing tendency.

Accordingly, it is desirable in the flowchart as shown in FIG. 10 that the state variable (lateral acceleration (Gy), yaw velocity (Yr), or estimated lateral acceleration (Gy1) calculated on the basis of the yaw velocity), which are affected by the road coefficient of friction (μ), may be used for the roll input magnitude (Rm), and the state variable (steering angular velocity (dδsw), or variation in time of the estimated lateral acceleration (dGy2) calculated on the basis of the steering angle), which are obtained on the basis of the steering angle (δsw) of the steering wheel SW, may be used for the roll input velocity (dRm), in combination with the former state variable. As a result, the dynamic roll increasing tendency can be estimated appropriately by the state variable obtained on the basis of the steering angle (δsw), and the static roll increasing tendency can be estimated appropriately by the state variable obtained on the basis of the state variable affected by the road coefficient of friction (μ), respectively. Furthermore, the intermediate roll increasing tendency can be estimated appropriately by the state variable obtained on the basis of a two-dimensional relationship, with the roll input magnitude (Rm) and roll input velocity (dRm) being as variables. With the rolling motion stability control being performed on the basis of the roll input magnitude (Rm) affected by the road coefficient of friction (μ), the braking force control and driving force control can be continued or terminated, appropriately.

Figure 12:
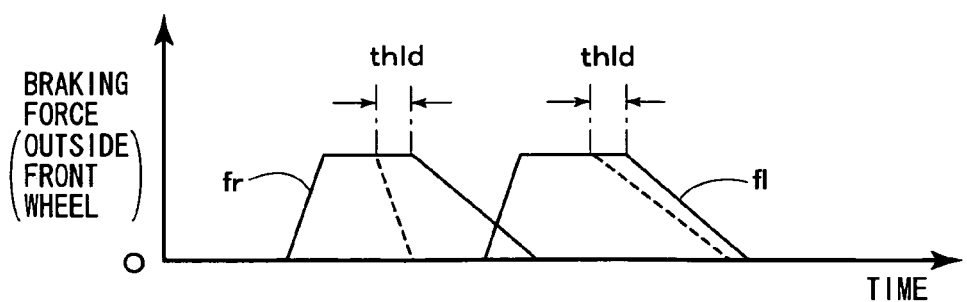
FIG. 12 is a time chart showing a control state according to a further embodiment of the present invention.

As described above, with the reference for terminating the control being changed, or with the decreasing gradient of the braking force being limited, before the braking force is applied through the braking force control for the turning operation in one direction, the braking force is applied through the braking force control for the turning operation in the other direction. Consequently, the rolling motion stability control can be achieved smoothly, when the steering wheel is steered to reverse the direction of the turning operation. This can be achieved by holding the braking force for a certain period of time, in the braking force control, as shown in FIG. 12, wherein the characteristic for the front right wheel is indicated by "fr", and the characteristic for the front left wheel is indicated by "fl". With the desired braking force as indicated by a broken line in FIG. 12 being held for a predetermined period of time (thld), the actual braking force as indicated by a solid line in FIG. 12 is decreased with a delay in time. Therefore, the braking force will not be reduced rapidly, when the braking force control is terminated. Consequently, the variation of rolling motion due to the variation of braking force will be restrained, to achieve the rolling motion stability control smoothly.

Figure 13:
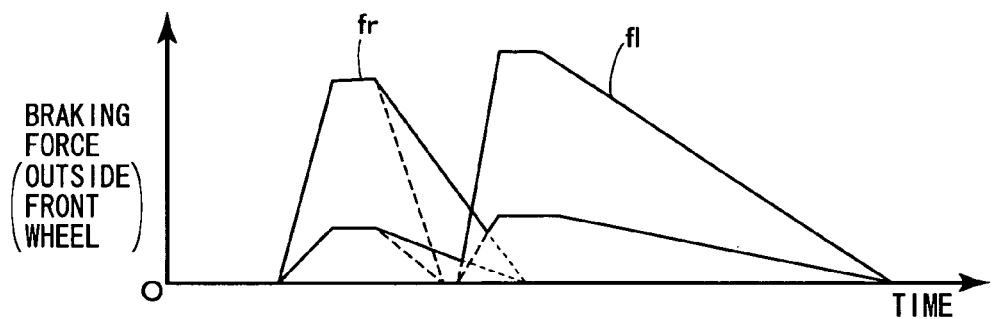
FIG. 13 is a time chart showing a control state according to a yet further embodiment of the present invention.
Figure 14:
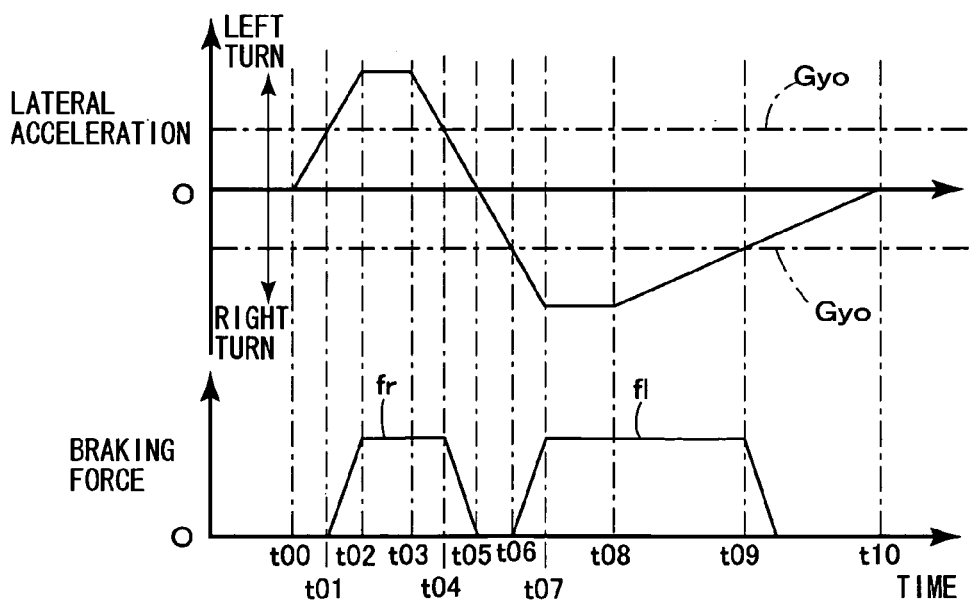
FIG. 14 is a time chart showing a control state according to a prior art.

Furthermore, in the case where the braking force is applied to a plurality of wheels, the braking force is increased from a state where the braking force is not zero, as shown in FIG. 13. With respect to the braking force applied to the front right wheel as indicated by (fr) in FIG. 13, the desired braking force is provided as indicated by a broken line in FIG. 13, while the actual braking force is gradually reduced, with its decreasing gradient being limited. When the turning direction is changed, the braking force is increased again. In this case, the braking force will not be reduced rapidly, when the braking force control is terminated, whereby the variation of rolling motion will be restrained, to achieve the rolling motion stability control smoothly.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A rolling motion stability control apparatus for restraining a roll increasing tendency of a vehicle to stabilize a rolling motion thereof, comprising:
    wheel brake means for applying braking force to each wheel of said vehicle;
    turning direction determination means for determining a turning direction of said vehicle;
    first braking force control means for applying a first braking force to said wheel through said wheel brake means, when said turning direction determination means determines that said vehicle is turned to one direction of said vehicle;
    second braking force control means for applying a second braking force to said wheel through said wheel brake means, when said turning direction determination means determines that said vehicle is turned to the other direction of said vehicle; and
    terminating control adjustment means for adjusting at least said first braking force control means to continue the first braking force being applied by said first braking force control means, until the second braking force is initiated to be applied by said second braking force control means, when said turning direction determination means determines that said vehicle is turned to the one direction, and then to the other direction.

2. A rolling motion stability control apparatus as set forth in claim 1, wherein said terminating control adjustment means provides a first reference for terminating a control by said first braking force control means for applying the first braking force, and a second reference for initiating a control of said second braking force control means for applying the second braking force, and wherein said terminating control adjustment means changes an absolute value of the first reference to be larger than an absolute value of the second reference, when said turning direction determination means determines that said vehicle is turned to the one direction, and then to the other direction.

3. A rolling motion stability control apparatus as set forth in claim 2, wherein said terminating control adjustment means further provides a third reference for initiating the control by said first braking force control means for applying the first braking force, with the absolute value of the first reference being set to be smaller than an absolute value of the third reference.

4. A rolling motion stability control apparatus as set forth in claim 1, wherein said turning direction determination means determines the turning direction of said vehicle on the basis of at least one of lateral acceleration, yaw velocity and steering angle of said vehicle.

5. A rolling motion stability control apparatus for restraining a roll increasing tendency of a vehicle to stabilize a rolling motion thereof, comprising:
    wheel brake means for applying braking force to each wheel of said vehicle;
    turning direction determination means for determining a turning direction of said vehicle;
    first braking force control means for applying a first braking force to said wheel through said wheel brake means, when said turning direction determination means determines that said vehicle is turned to one direction of said vehicle;
    second braking force control means for applying a second braking force to said wheel through said wheel brake means, when said turning direction determination means determines that said vehicle is turned to the other direction of said vehicle; and
    limitation means for limiting an absolute value of a decreasing gradient of the first braking force to be smaller than a predetermined value, when at least the first braking force is reduced, wherein the predetermined value is set to continue the first braking force being applied by said first braking force control means, until the second braking force is initiated to be applied by said second braking force control means.

6. A rolling motion stability control apparatus as set forth in claim 5, wherein said turning direction determination means determines the turning direction of said vehicle on the basis of at least one of lateral acceleration, yaw velocity and steering angle of said vehicle.

* * * * *